United States Patent [19]
Mendoza

[11] 3,762,216
[45] Oct. 2, 1973

[54] AUTOMATED LIQUID PENETRANT INSPECTION SYSTEM

[76] Inventor: Emilio Mendoza, 5018 Northfield Drive, San Antonio, Tex. 78228

[22] Filed: Feb. 23, 1971

[21] Appl. No.: 118,010

[52] U.S. Cl. .................................. 73/104, 118/9
[51] Int. Cl. ....................... G01b 5/28, G01n 19/08
[58] Field of Search ...................... 118/7, 9; 73/104

[56] References Cited
UNITED STATES PATENTS

| | | | |
|---|---|---|---|
| 2,515,396 | 7/1950 | De Forest et al. | 73/104 |
| 2,806,959 | 9/1957 | De Forest et al. | 73/104 |
| 3,227,130 | 1/1966 | Weiskopf | 134/95 |
| 3,400,726 | 1/1968 | Du Grail | 134/95 |

*Primary Examiner*—Herbert Goldstein
*Attorney*—Harry A. Herbert, Jr. and Arsen Tashjian

[57] ABSTRACT

A system of in situ inspection of critical jet engine parts for defects by applying a high penetrating fluorescent oil and inspecting under a light of the proper wavelength. The system which is unitized and portable includes an evacuatable chamber suitable for containing the parts to be inspected. A series of tanks containing the pressurized solutions of penetrant emulsifier wash and developer as well as a hot-air tank are operatively connected to the chamber so that the required solution can be applied under proper conditions for the necessary time period to thereby disclose any defect in the critical engine part.

1 Claim, 1 Drawing Figure

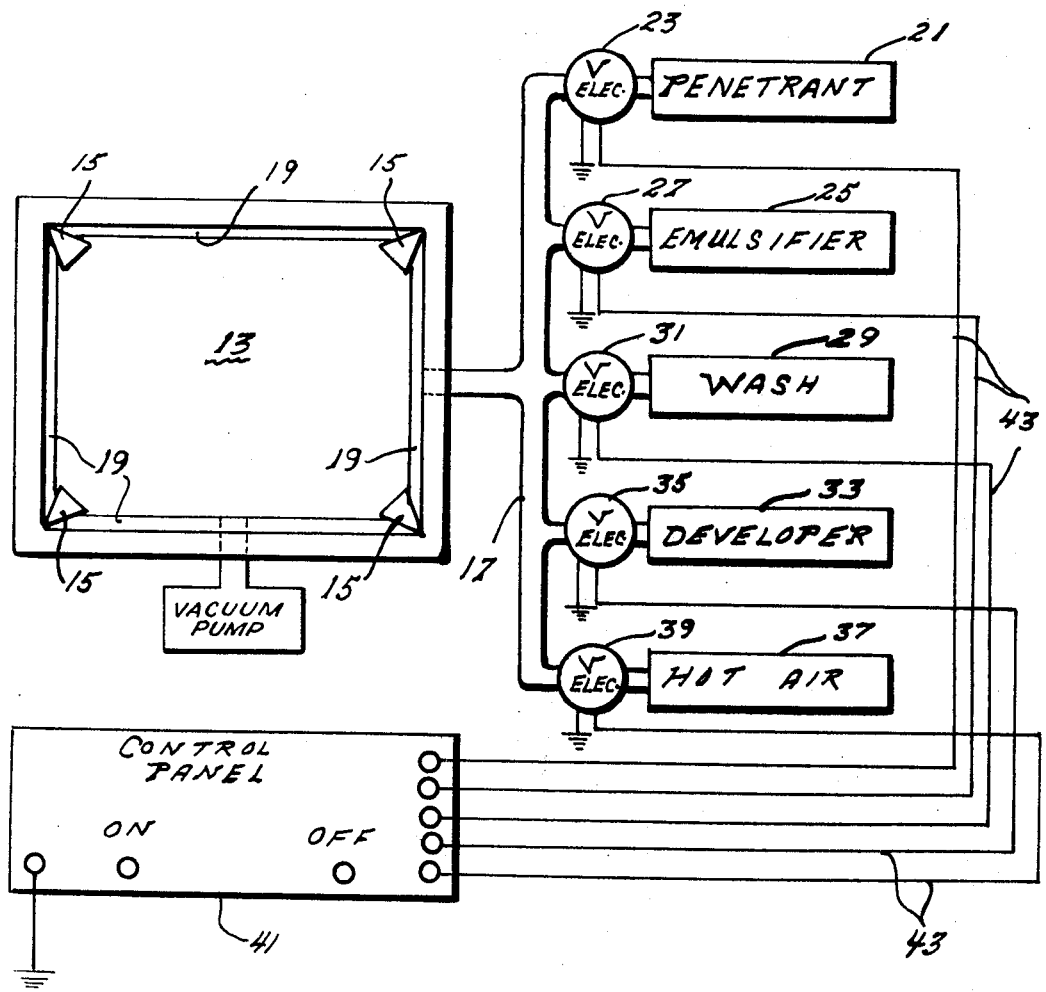

AUTOMATED LIQUID PENETRANT INSPECTION SYSTEM

BACKGROUND OF THE INVENTION

The invention relates to a unitized portable in situ inspection system for conducting penetration dye tests on metal parts and assemblies at any convenient location rather than at the fixed location of the testing equipment.

Certain critical parts such as turbine and compressor blades for jet engines require extremely careful inspection for locating possible defects such as cracks. A common method of performing this critical inspection is called the "liquid penetrant method." The principle involved includes the application of a high penetrating fluorescent oil on the part. The oil will penetrate into any defects such as cracks which may be present on the surface of the part. The excess oil is then removed and a light of the proper wavelength is directed on the part making any defects which may be present readily detectable.

The above-described method involves the use of certain chemicals and, although they generally remain on the part a very short time, the time is very critical for the successful detection of minute defects. The present method of performing this inspection is through the use of costly conveyor systems and highly complex electronic control equipment. Generally, four tanks are placed in a line for servicing the conveyor system. The tanks contain penetrant, emulsifier, wash and developer. If each tank is assumed to be 3 feet long, a floor space of approximately 27 linear feet is required to set up and operate an automated inspection system utilizing presently available equipment.

It can be seen that it would be most desirable to eliminate all of the costly material handling equipment and complex electronic timing apparatus. This can be accomplished by providing a system wherein the parts being inspected are kept stationary or fixed and the solutions are piped in. Also, by using pressurized solutions, good coverage is insured and the critical timing can be achieved much more easily than by any presently known systems. Thus, a great saving in equipment, skills and time, as well as increased reliability would be realized.

SUMMARY OF THE INVENTION

The present invention is concerned with providing a highly reliable system wherein critical parts can be inspected for surface defects by the use of a high penetrating fluorescent oil. A unitized portable system including a container for holding the parts to be inspected and the required chemicals are combined into a single apparatus which quickly and easily makes the necessary tests and provides the results with a minimum expenditure of time and effort.

Accordingly, it is an object of the present invention to provide a simple unitized portable apparatus for performing in situ tests by the liquid penetrant method on jet engine parts or the like.

Another object of the invention is to provide an automated system for inspecting large numbers of relatively small engine parts such as turbine and compressor blades by piping in the solutions to a container under vacuum which holds the parts to be tested.

Still another object of the invention is to provide a method for performing liquid penetrant tests on engine parts which will eliminate the use of costly conveying equipment by utilizing an automated in situ system. The system requires comparatively simple timing apparatus which is precise and reliable.

A further object of the invention is to provide a liquid penetrant testing system wherein the penetrant, emulsifier, wash, and developer fluids are stored under pressure in tanks operatively connected to a container for holding the parts to be tested. This system allows the solutions to be applied with full uniformity and with the required precise timing.

A still further object of the invention is to provide an automated liquid penetrant inspection system utilizing readily available components which can be easily assembled and which can be operated by personnel with a minimum of technical skills while at the same time producing results quickly with complete reliability.

These and other objects, features and advantages will become more apparent after considering the following detailed description taken in conjunction with the illustrative embodiment in the accompanying drawing.

DESCRIPTION OF THE DRAWING

The FIGURE is a view in schematic of an automated liquid penetrant inspection system according to the invention showing the unitized and portable nature of the system.

DESCRIPTION OF A PREFERRED EMBODIMENT

Referring now to the FIGURE, there is shown a schematic view of the automated inspection system. The parts to be inspected are housed in the chamber 13. A series of nozzles 15 are positioned at locations in the wall of the chamber or container 13 preferably at each corner. A manifold element 17 serves to carry various solutions to conduits 19 in the wall of container 13 and to the nozzles 15 attached thereto. The container 13 in which the parts to be inspected are held may be vacated by lowering to below atmospheric pressure for improved results during the operation of the various steps required to make the tests.

A series of pressure vessels are operatively attached to the manifold 17 through a corresponding series of electrically operated valves. The first pressure vessel 21 contains a solution of penetrant which is applied to the part in the chamber 13 by opening the valve 23. A second pressure vessel 25 contains an emulsifier which is applied to the part when the valve 27 is opened. After these procedures, the third pressure vessel 29 containing a wash solution is caused to be injected through the nozzles 15 to the chamber 13 when the valve 31 is electrically opened. A fourth pressure vessel 33 which contains a developer is connected to the manifold 17 through the valve 35 for the purpose of applying the solution to the part to be inspected in the container 13. The part is then caused to be dried by the application of hot air from the fifth pressure vessel 37 when the valve 39 is opened.

The valves 23, 27, 31, 35, and 39 are controlled by the panel 41 which is connected to the several valves by the lead wires 43. Since each valve is grounded, the circuit to any one particular valve is completed when the internal connections (not 51 within the control panel 47 are grounded. Any appropriate timing circuitry can be added if desired to precisely time each particular spraying operation.

MODE OF OPERATION

In operation, the parts to be inspected are placed in the chamber 13. In order to obtain better results, the chamber 13 can be evacuated prior to the application of some of the solutions. The first valve 23 is caused to be opened by pushing the appropriate button on the control panel 41. This allows the penetrant in the first pressure vessel 21 to enter the manifold element 17 and then pass to the conduits 19 and emerge from the nozzles 15 as a spray and impinge on the part to be inspected in the chamber 13. After passage of a predetermined time interval, valve 23 is closed and the penetrant is allowed to remain on the part. Then the second valve 27 is caused to be opened allowing the emulsifier to flow into the manifold 17 from the second pressure vessel 25. This solution also flows into the conduits 19 and through the nozzles 15 onto the part being inspected. After the proper amount of emulsifier has been applied, the second valve 27 closes.

The emulsifier remains on the test part for a predetermined time and then the third valve 31 is caused to be opened allowing a wash solution from the third pressure vessel 29 to enter the manifold 17, pass through the conduits 19 and emerge from the nozzles 15. The test part is thus washed clean of the excess penetrant and emulsifier. The next step in the inspection process involves the application of developer to the washed test piece. This is accomplished by causing the fourth valve 35 to open and allowing the developer to enter the manifold 17 from the fourth pressure vessel 33. The developer is sprayed on the test piece in the chamber 13 and after the passage of the proper time interval the valve 35 is closed and any defects on the part to be inspected begin to become visible. The test piece is then dried by the application of hot air from the fifth pressure vessel 37 when the fifth valve 39 is opened and the hot air passes through the manifold 17, the conduits 19 and the spray nozzles 15. After the test piece has dried, the vacuum in the chamber 13 is destroyed and the part is ready for inspection.

In practice, the solutions are fed to the spraying nozzles 15 for specific predetermined time intervals which are controlled either mechanically or electrically. The container or chamber 13 is generally designed around the parts to be inspected and a basket of blades can be handled by a 36 inch cubic box constructed of either transparent plastic or sheet metal. For best results in applying the penetrant and emulsifier and also drying the parts after the wash cycle, the chamber 13 should be evacuated. The vacuum pressure can be determined experimentally for the specific part being processed.

Although the invention has been illustrated in the accompanying drawing and described in the foregoing specification in terms of a preferred embodiment thereof, the invention is not limited to this embodiment or to the preferred configuration mentioned. It will be apparent to those skilled in the art that my invention can be practiced by utilizing other solutions in the pressure vessels such as an additional tank for cleaning solution and freon can be used as a carrier. Also, it should be understood that various changes, alterations, modifications and substitutions, particularly with respect to the construction details can be made in the arrangement of the several elements without departing from the true spirit and scope of the amended claims.

Having thus described my invention, what I claim and desire to secure by Letters Patent of the United States is:

1. An improved unitized automated liquid penetrant inspection system for in situ testing of parts, comprising, in combination, a chamber for holding parts to be tested, vacuum pump means for evacuating said chamber to a predetermined negative pressure, a plurality of nozzles positioned on the inner wall of said chamber, a conduit operatively connecting said nozzles to each other, a manifold element having a plurality of inlets and a single outlet, the outlet of said manifold being operatively connected to said conduit, a plurality of pressure vessels each having an outlet connected to a separate inlet in said manifold element, one of said pressure vessels containing penetrant, another of said pressure vessels containing emulsifier, another of said pressure vessels containing washing solution, another of said pressure vessels containing developer, and another of said pressure vessels containing hot air, an electrically controlled valve positioned between the outlet of each of said pressure vessels and the corresponding inlet in said manifold element, and means for selectively controlling the flow of material from each of the pressure vessels through the manifold element to the conduit and nozzles in said evacuated chamber so as to impinge on the parts to be tested in a predetermined sequence for a predetermined time interval.

* * * * *